United States Patent [19]

Nighan et al.

[11] Patent Number: 4,646,311
[45] Date of Patent: Feb. 24, 1987

[54] MULTI-COMPONENT BUFFER GAS MIXTURE FOR XEF(C→A) LASER

[75] Inventors: William L. Nighan, Manchester, Conn.; Frank K. Tittel; William L. Wilson, Jr., both of Houston, Tex.

[73] Assignee: United Technologies Corporation, Hartford, Conn.

[21] Appl. No.: 726,530

[22] Filed: Apr. 24, 1985

[51] Int. Cl.$^4$ .............................................. H01S 3/22
[52] U.S. Cl. ........................................ 372/60; 372/57
[58] Field of Search ........................ 372/55, 57, 59, 60

[56] References Cited
PUBLICATIONS

Nighan et al, "Synthesis of Rare Gas-Halide Mixtures Resulting in Efficient XeF(C→A) Laser Oscillation Using 9-Beam Excitation", J. Appl. Digs. 56(1), Jul. 1984.

Primary Examiner—Léon Scott, Jr.
Attorney, Agent, or Firm—Eric W. Petraske

[57] ABSTRACT

A xenon fluoride (C→A) laser operating in the visible region is improved by the use of a synthesized buffer gas containing at least two components that combine to provide kinetic properties that are different from those of any single-component buffer gas.

5 Claims, 4 Drawing Figures

MULTI-COMPONENT BUFFER GAS MIXTURE FOR XEF(C→A) LASER

The Government has rights in this invention pursuant to Contract No. N00014-76-C-0847 awarded by the Department of the Navy.

TECHNICAL FIELD

The field of the invention is that of electronic transition lasers such as excimer lasers.

BACKGROUND ART

Excimer lasers and other similar electronic transistion lasers use a lasing species that is an electronically excited, unstable compound that dissociates or is otherwise destroyed kinetically immediately after the lasing transition. Of the excimer lasers, those of the rare gas-halide class are among the most promising because of their high efficiency. Rare gas-monohalide excimer molecules such as KrF, XeCl and XeF, for example, produce ultraviolet (UV) laser radiation resulting from transitions between the B and X states (the letters B and X being conventional references to particular states of the excimer). However, in addition to the UV B→X transition, the XeF rare gas-monohalide alone exhibits laser action on another transition designated as the C→A transition. Unlike the UV B→X transition, the XeF(C→A) laser transition is centered in the visible region of the spectrum at about 485 nm, and exhibits an exceptionally broad spectral width extending to wavelengths as low as 450 nm and as high as 520 nm. Because of its broadband output, the XeF(C→A) laser possesses unique potential for development as a tunable optical source for the blue-green region of the spectrum. In order to generate XeF(C→A) laser oscillation the prior art has used a gaseous mixture comprising a single buffer gas, such as argon for example, together with a small amount of xenon and a donor gas which provides the necessary fluorine atoms.

Electrical excitation in the form of high-energy electron beams or electric discharges has been used to excite the XeF(C→A) laser in the art, but these methods have suffered from severe disadvantages that have limited their potential. In particular, the intense electrical excitation required to produce a sufficient number of excited XeF(C) states results in a very large electron concentration, but the electrons mix together the B and C states of the XeF excimer, thereby providing a channel for the competing UV (B→X) transition that drains away excited states before they can provide the desired visible C→A lasing transition. Also, electrical excitation results in large concentrations of ionized and excited species related to the mixture constituents, several of which absorb within the wavelength region of the C→A transition, thereby limiting the net gain of the laser and severely limiting the buildup of optical flux in the laser cavity. These problems are well recognized in the prior art and are described as fundamental limitations of electrical excitation by W. K. Bischel et al in the *Journal of Applied Physics*, Volume 52, page 4429, 1981 and in *Applied Physics Letters*, Volume 34, page 565, 1979. In an effort to avoid the aforementioned problems accompanying use of electrical excitation, Bischel et al used photolytic pumping of mixtures containing $XeF_2$. This method has proved successful, for improving gain, but the necessary apparatus required adds considerably to the complexity of the system.

DISCLOSURE OF INVENTION

The invention relates to an improved gas mixture for an electrically excited XeF(C→A) laser in which the buffer gas is comprised of at least two species in proportions chosen so as to specifically tailor the kinetics and optical properties of the active medium in a manner not possible using any single buffer species.

BEST MODE OF CARRYING OUT THE INVENTION

Figure 1:
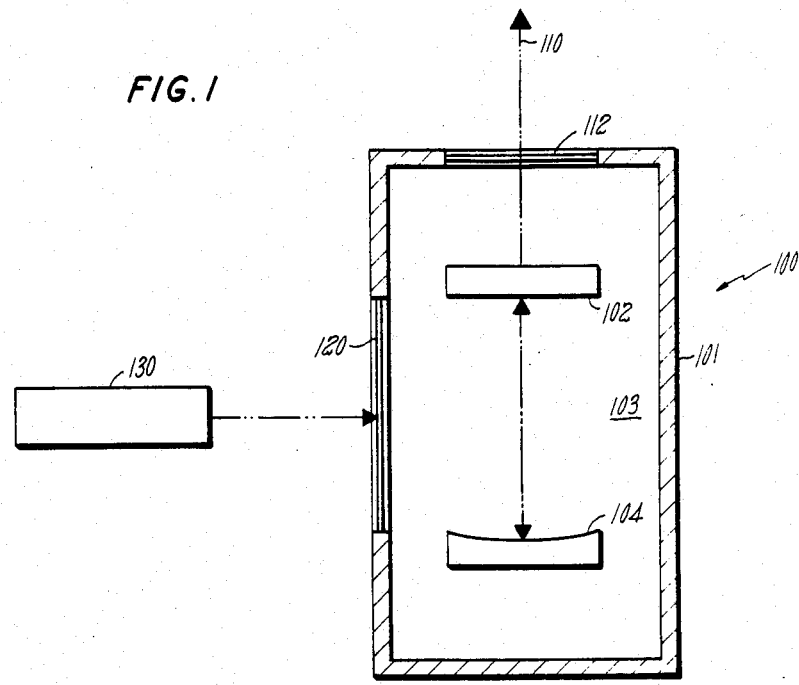
FIG. 1 illustrates an apparatus for practicing the invention.

FIG. 1 illustrates in simplified form an apparatus for producing an XeF(C→A) laser. The diagram is adapted from an article by Frank K. Tittel et al in the *IEEE Journal of Quantum Electronics*, Volume QE-17, page 2268, 1981. This prior art work used a gas mixture of argon, xenon and $NF_3$ to produce the lasing transition, with argon being the single buffer gas and xenon and $NF_3$ being reactive components. In the diagram, gas cell 100 includes an optical cavity bounded by flat mirror 102 and a curved totally reflecting mirror 104. Typically, mirror 102 has a reflectance of about 95% at the visible wavelength region of interest, permitting a portion of the radiation to pass out of the cavity through window 112 and emerge as output beam 110. Gas cell 100 contains a gas mixture indicated by the numeral 103 that was varied to investigate the dependence of laser output on gas composition. The laser was pumped by an electron beam from an apparatus indicated by the numeral 130, illustratively a Physics Internation Pulserad 110 electron beam generator. This machine is capable of producing 15 kA pulses of 1 Mev electrons, with a 10 ns pulse duration. The electron beam passes through foil 120 which is a titanium foil 50 micrometers thick that serves to isolate gas mixture 103 from the vacuum surrounding the electron beam.

The gas cell, mounting hardware for the laser and the method of injecting electrons are part of the prior art and form no part of the invention, which is concerned with an improved gas mixture. Further details on the apparatus may be found in an article by G. Marowsky et al in *Applied Optics*, Vol. 17, page 3491, 1978. Other means of designing the optical resonator and/or injecting the electrons (or other energetic particles) are known to those skilled in the art.

When the XeF(C→A) excimer laser was first discovered, it offered great promise for providing a tunable laser source in the blue-green region of the spectrum. These expectations have not been realized, however, primarily because the efficiency of converting electrical energy to output optical energy has been extremely low (typically very much less than 1.0%), as a result of the two adverse factors mentioned above: the competition of the UV B→X transition and the absorption of visible wavelength laser radiation by other ionized and excited species that are present. The high concentration of electrons that is necessary to inject enough energy into the gas mixture has the unfortunate side effect that the B state of the XeF excimer is collisionally mixed by electrons with the C state, and both the B and C states are collisionally destroyed by the electrons as well. Under these conditions the UV B→X laser transition at 351 nm is strongly favored and tends to rob energy away from the population in the desired XeF(C) state before visible C→A laser oscillation can occur.

Figure 2:
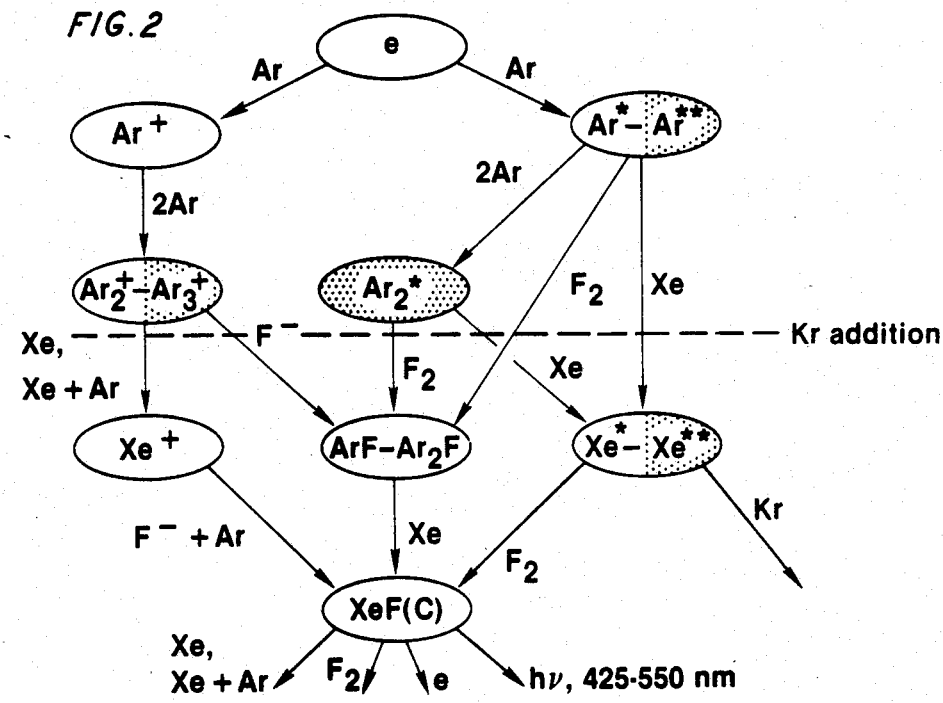
FIG. 2 illustrates major kinetic paths to and from XeF(C); major absorbers of XeF(C→A) laser radiation are shaded.

In order for an excimer laser to work with reasonable efficiency, it is necessary that the highly nonequilibrium artificial environment produced by electrical excitation generate the lasing species in sufficient quantity; not quench or otherwise destroy the excimers for a sufficiently long time so that they may form the lasing transition; not produce absorbing species and also not react chemically with other constituents of the gas mixture to produce a chemical (as opposed to electrochemical) reaction that would interfere with the lasing process. These criteria have been elucidated by the inventors in their article on XeF(C→A) lasers by Y. Nachshon et al in the *Journal of Applied Physics*, Volume 56, page 36, 1984. In addition, this work revealed for the first time the major kinetic paths to and away from the desired XeF(C) state in electrically excited mixtures comprised of a single buffer species, xenon and one or more fluorine donors. FIG. 2 illustrates these pathways for a mixture comprised of Ar-Xe-F$_2$-NF$_3$. Of even more importance, the inventors work resulted in the first identification of the major species in the XeF(C) reaction path that absorb XeF(C→A) laser radiation in the blue-green region of the spectrum. These absorbing species are shaded in FIG. 2. Recognition of the aforementioned factors, combined with understanding of the advantages and disadvantages of different buffer gases as regards their influence on the properties of the XeF(C→A) laser medium, suggested to the inventors that use of two or more different buffer gas components in combination would result in improved XeF(C→A) laser performance.

Figure 3:
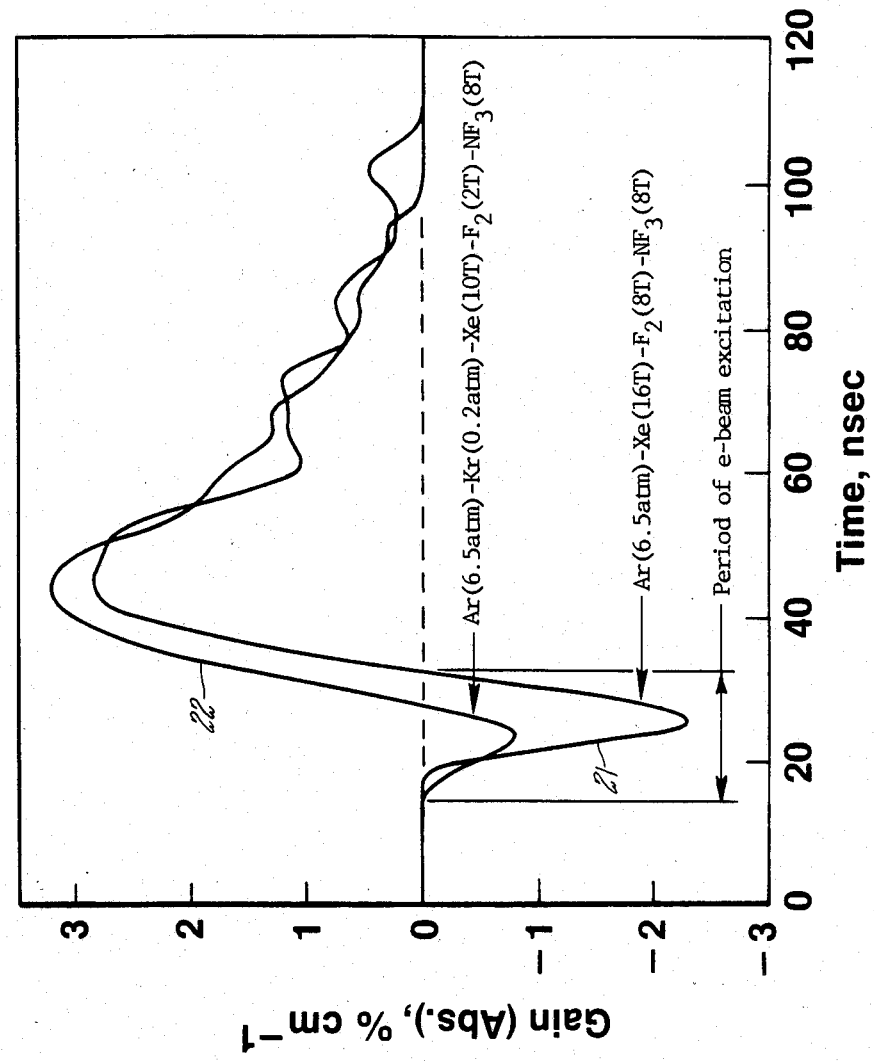
FIG. 3 illustrates curves showing the time dependence of gain and absorption for a prior art XeF(C→A) excimer laser mixture using a single buffer species and the preferred embodiment using two buffer species in combination.

Curve 21 of FIG. 3 shows a representative time dependent gain-absorption profile at a wavelength of 488 nm for an Ar-Xe-NF$_3$-F$_2$ mixture optimized according to earlier work by the same inventors under conditions for which laser pulse energy density and intrinsic efficiency were typically 1.5±0.3 J/liter and ~1.0%, respectively. Comprehensive analysis of medium kinetic processes indicates that for these prior art conditions the initial period of strong absorption occurring during the excitation pulse is primarily the result of photoionization of the 4p, 3d and higher lying states of Ar, and of the Xe 6p and 5d states, along with photodissociation of

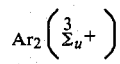

and Ar$_3$+; these absorbing species are designated as Ar, Xe, Ar$_2$* and Ar$_3$+ in FIG. 2. These broadband absorption processes more than offset the positive contribution to the gain of XeF(C) excimer molecules during and immediately following the period of e-beam excitation. Although the Ar-related absorption processes decay rapidly, photoionization of Xe excited states is very significant even after the net gain becomes positive, thereby substantially reducing the peak gain value from that which would be possible if there were no absorption.

It was found by the inventors that addition of Kr as a second buffer component dramatically reduced the initial absorption of the previously optimized Ar-Xe-NF$_3$-F$_2$ mixture. It is believed that the most likely explanation for this observation is that Kr reduces the concentrations of both

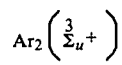

and Ar$_3$+ during the period of e-beam excitation, while providing additional decay channels for the absorbing Xe 6p and 5d states. However, measurements showed that the additional quenching of the XeF(C) laser molecule by Kr also introduced a significant detrimental effect, so that the peak gain and the gain duration typical of the initial experimentation when Kr was merely added to an Ar-Xe-F$_2$-NF$_3$ mixture were not improved, giving no increase in laser pulse energy/efficiency from previously optimized mixtures without Kr.

A systematic measurement and evaluation of XeF(C→A) net gain temporal profiles and laser pulse energy, as a function of the fractional concentrations of each of the reactive components Xe, F$_2$ and NF$_3$ in mixtures containing both Ar and Kr in combination led to a re-optimized mixture resulting in substantial improvement in laser performance. The absorption peak during the period of e-beam excitation was found to be significantly reduced for Kr pressures in the 0.1–1.0 atm range. Curve 22 of FIG. 3 shows the measured net gain temporal profile for a reoptimized mixture containing 0.2 atm Kr, 6.5 atm Ar, 10 Torr Xe, 8 Torr NF$_3$ and 2 Torr F$_2$, excited under the same conditions as the original prior art mixture of curve 21. The significant reduction in absorption during the excitation pulse with Kr in the mixture is readily apparent, as is the higher value of XeF(C→A) peak gain and the increase in gain duration to about 80 nsec. These features were typical of Kr pressures throughout the entire 0.1–1.0 atm range.

Measurements show that the magnitude of the absorption peak (FIG. 3) with Kr in the mixture is relatively insensitive to the specific values of Xe or F$_2$ pressure, but that the peak gain (and its rate of decay) are dependent on the concentrations of these species. Thus, in order to compensate for the additional quenching of XeF(C) caused by the presence of a few tenths of an atmosphere of Kr, the optimum concentrations of both Xe and F$_2$ must be reduced below their values in the absence of Kr, indicative of the importance of reoptimization of the fractional concentration of each reactive component as the buffer constituents are varied. Specific details and findings of this mixture re-optimization procedure are described by the inventors in their article by W. L. Nighan et al in *Applied Physics Letters*, Volume 45, page 947, 1984.

Although the inventors' measurements indicate that the primary role of Kr is reduction of the concentrations of Ar-and Xe-related species that absorb in the blue-green region of laser operation, the measured rate of rise of the XeF(C→A) fluorescence and its peak value both are significantly higher with Kr in the mixture, and the spectral width of the fluorescence extends over a larger wavelength range. Analysis shows that these effects are much more pronounced than would be expected on the basis of faster equilibration of the XeF B and C states due to Kr, thereby indicating that the presence of Kr as a second buffer species also enhances XeF(C) formation in addition to reducing the concentrations of absorbing species.

Figure 4:
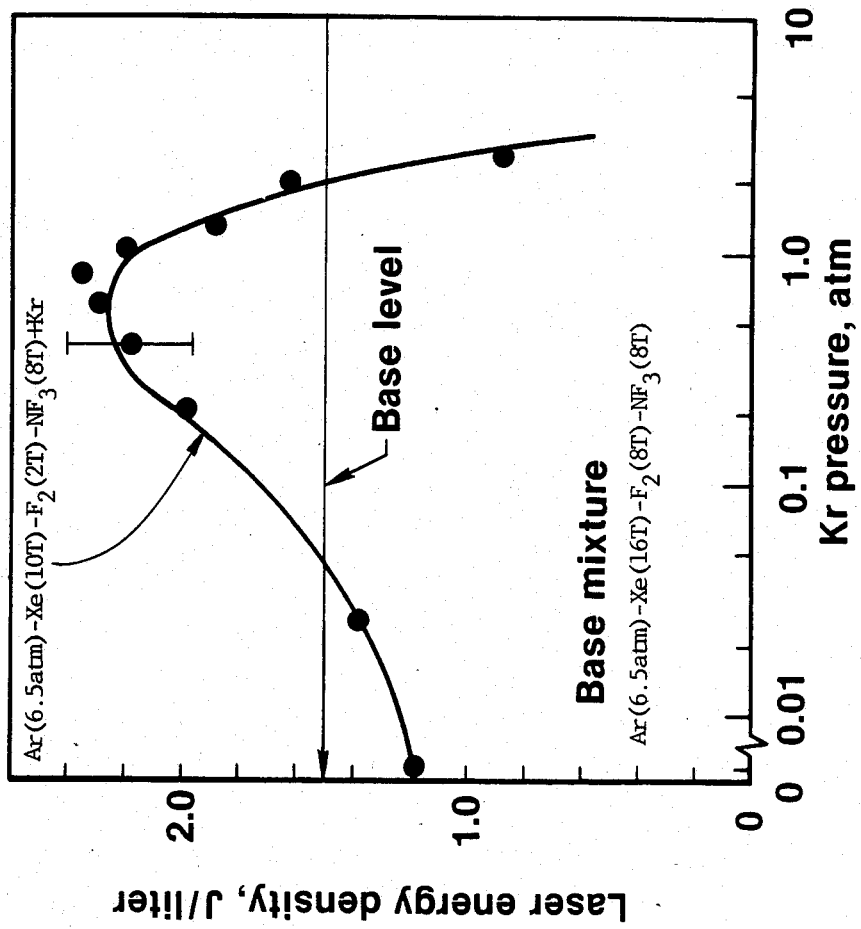
FIG. 4 illustrates the dependence of the time integrated XeF(C→A) laser energy density in the blue-green region as a function of one parameter of the buffer gas, in this example, Kr.

Presented in FIG. 4 is the dependence of XeF(C→A) laser pulse energy density on Kr pressure for the specific re-optimized Ar-Xe-$F_2$-$NF_3$ mixture of curve 22. The mixture of the same four-components optimized in the absence of Kr (curve 21) consistently results in laser pulse energy density values of 1.5±0.3 J/liter for the present conditions, indicated by the horizontal line labeled base level in the figure. FIG. 4 shows that as the Kr pressure is increased above ∼0.05 atm for the reoptimized mixture, the laser pulse energy increases above the ∼1.5 J/liter base level of the reference no-Kr mixture. For Kr pressures in the 0.4-0.9 atm range, a broad maximum in laser energy density is achieved, corresponding to ∼50% increase over that of the reference mixture, a result that is consistent with the observed improvement in the net gain profile shown in FIG. 3. The maximum 2.2+0.3 J/liter XeF(C→A) lasing radiation pulse density in the blue-green region that is typical of these improved conditions corresponds to an intrinsic energy conversion efficiency estimated to be approximately 1.5%, a value that for the first time compares favorably with the well known rare gas-halide UV B→X lasers. For the conditions of FIG. 4, but with the Ar pressure increased from 6.5 to 8.5 atm, the laser pulse energy was found to increase from 2.2 J/liter to ∼3.0 J/liter.

Measurements were also carried out for Kr pressures in the 3-4 atm range with no Ar in the mixture, so as to achieve a condition for which the energy deposited by the e-beam would be very nearly equivalent to Ar-buffered mixtures without Kr. In these tests, with the Xe and $F_2$ pressures reoptimized, the maximum laser pulse energy density was in the 0.5-0.7 J/liter range, a value much lower than that of either the original no-Kr reference mixture or of the re-optimized mixture with Kr present. Thus, all evidence indicates that the use of two constituents such as Ar and Kr in combination, so as to create synthesized buffer gas properties, results in an XeF(C→A) laser medium that, when electrically excited, is characterized by significantly lower concentrations of excited and ionized species that absorb in the blue-green region than is the case using either Ar or Kr or any other single buffer species alone. Indeed, the inventors also found that mixtures comprised of Ne and Ar in combination or Ne and Kr in combination so as to form a synthesized buffer gas resulted in XeF(C→A) laser pulse energy density of approximately 1.0 J/liter, indicating that a light rare gas such as Ne (or He) combined with a heavy rare gas like Ar or Kr also constitutes a satisfactory XeF(C→A) laser mixture.

Collision processes in a laser medium involving ionized, excited or neutral species that affect the concentrations of various species in the medium, particularly that of the laser molecule itself, are referred to in the trade as "kinetic" properties, or simply as kinetics. Medium characteristics such as the presence of species that absorb radiation, particularly at the laser wavelength, the photooptical cross sections of these species, etc, are commonly referred to in the trade as "optical" properties. The inventors have demonstrated that use of specific combinations of gases such as Ar and Kr to form a synthesized buffer gas permits generation of optimum kinetic and optical properties for the XeF(C→A) laser for which XeF(C) is produced more efficiently, while transient absorption at the laser wavelength is minimized. The demonstrated optical extraction efficiency of 20-25% is unprecedented for an electrically excited XeF(C→A) laser. Indeed, the values of laser energy density (2-3 J/liter) and intrinsic efficiency (1-2%) typical of the present electron-beam excited XeF(C→A) laser medium are, for the first time, comparable to those of other blue-green lasers such as HgBr(B→X) and wavelength shifted XeCl(B→X) or XeF(B→X). However, only the XeF(C→A) laser is tunable throughout the entire blue-green region of the spectrum. Additionally, it is likely that mixture synthesis of the type employed by the inventors will find application as a means to improve the performance of other laser systems, and the appended claims are not meant to be limited to the Ar-Kr buffered XeF(C→A) laser system exhibited, but to apply generally to tailored "equivalent" gases formed by the combination of two or more elements having beneficial kinetic and/or optical properties in combination that are not achievable with either of the individual elements used alone or with any other single element.

We claim:

1. An excimer laser comprising:
    a gaseous gain medium comprising a buffer gas, xenon, and a fluorine donor gas;
    means for exciting said gain medium to form a quantity of the xenon fluoride excimer in the excited C state; and means for resonating or amplifying xenon fluoride C→A radiation of the 450-520 nm wavelength band in said gaseous gain medium, characterized in that:
    said buffer gas comprises first and second buffer gas constituents that are combined in a predetermined proportion such that the combined kinetic properties of said buffer gas are different from corresponding kinetic properties of any single buffer gas constituent, and further characterized in that said first and second buffer gas constituents interact preferentially with different excited species within said gaseous gain medium resulting in optical properties of said gaseous gain medium that are different from corresponding optical properties of any gaseous gain medium having only a single buffer gas constituent, said combination of said combined kinetic properties and said combined optical properties further being adapted to enhance laser energy, efficiency, and spectral properties, and being different from that of any single buffer gas.

2. A laser according to claim 1, further characterized that said first and second buffer gas constituents are rare gases.

3. A laser according to claim 2, in which krypton is one of said buffer gas constituents.

4. A laser according to claim 2,
    in which said first buffer gas constituent is selected from the group consisting of Ar, Ne and He at a total partial pressure of at least one atmosphere; and
    said second buffer gas constituent is Kr.

5. A laser according to claim 4, in which said first buffer gas constituent is Ar, Ne or He at a pressure of at least 3 atmospheres;
    said second buffer gas constituent is Kr at a pressure of at least 0.1 atmospheres;
    said xenon is at a pressure in the range of 3 to 30 Torr; and
    said at least one fluorine donor gas has a total partial pressure in the range of 3 to 30 Torr.

* * * * *